United States Patent [19]

Pow et al.

[11] Patent Number: 5,456,889
[45] Date of Patent: Oct. 10, 1995

[54] APPARATUS FOR THE SELECTIVE OXIDATION OF CARBON MONOXIDE IN A HYDROGEN-CONTAINING GAS MIXTURE

[75] Inventors: Eric G. Pow, Vancouver; Mihai Talaba, Surrey; Leonard McNeilly, Burnaby; David S. Watkins, Coquitlam; Donald A. Lines, Vancouver, all of Canada

[73] Assignee: Her Majesty the Queen in right of Canada, as representative by the Minister of National Defence, Ottawa, Canada

[21] Appl. No.: 228,940

[22] Filed: Apr. 14, 1994

Related U.S. Application Data

[62] Division of Ser. No. 959,070, Oct. 9, 1992, Pat. No. 5,316,747.

[51] Int. Cl.⁶ ..................................................... F01N 3/10
[52] U.S. Cl. .................. 422/173.1; 422/176; 422/177; 422/182; 422/196; 422/198; 422/211; 422/220
[58] Field of Search ................................. 422/175, 176, 422/177, 182, 196, 220, 173, 211, 198, 206; 423/246–247, 437 M, 656, 659, 539, DIG. 6; 55/269; 429/20, 19

[56] References Cited

U.S. PATENT DOCUMENTS

| | | | |
|---|---|---|---|
| 1,691,903 | 11/1928 | Mortimer | 422/198 |
| 2,127,561 | 8/1938 | Herrmann | 422/190 |
| 4,430,304 | 2/1984 | Spurrier et al. | 422/204 |
| 4,504,447 | 3/1985 | Spurrier et al. | 422/204 |
| 4,540,045 | 9/1985 | Molitor | 165/164 |
| 4,619,317 | 10/1986 | Dissellbeck et al. | 165/162 |
| 4,659,634 | 4/1987 | Struthers | 429/19 |
| 4,692,322 | 9/1987 | Moller et al. | 423/648 R |
| 4,729,931 | 3/1988 | Grimble | 429/17 |
| 4,737,161 | 4/1988 | Szydlowski et al. | 48/61 |
| 4,781,241 | 11/1988 | Misage et al. | 165/1 |
| 4,789,540 | 12/1988 | Jenkins | 423/648.1 |
| 4,812,373 | 3/1989 | Grimble et al. | 429/19 |
| 4,840,783 | 6/1989 | Quang et al. | 423/648.1 |
| 4,865,624 | 9/1989 | Okada | 48/61 |
| 4,877,693 | 10/1989 | Baker et al. | 429/19 |
| 4,933,242 | 6/1990 | Koga et al. | 429/19 |
| 4,946,667 | 8/1990 | Beshty | 423/648.1 |
| 4,983,471 | 1/1991 | Reichner et al. | 429/20 |
| 5,250,090 | 10/1993 | Vandervort et al. | 55/269 |

FOREIGN PATENT DOCUMENTS

| | | |
|---|---|---|
| 0349011 | 3/1990 | European Pat. Off. . |
| 0430184 | 5/1991 | European Pat. Off. . |
| 63-291802 | 11/1988 | Japan . |
| 453365 | 2/1988 | Sweden . |
| WO90/12985 | 11/1990 | WIPO . |

OTHER PUBLICATIONS

"Fuel Cell Sports Novel Reformer Design", Chemical Engineering, Author Unknown, Feb. 1990.

"The Off–The–Shelf Plate Heat Exchangers", Brochure From Alfa–Laval Thermal Company, Author Unknown, Jun. 1989.

*Primary Examiner*—Robert J. Warden
*Assistant Examiner*—Hien Tran
*Attorney, Agent, or Firm*—McAndrews, Held & Malloy, Ltd.

[57] ABSTRACT

A method and apparatus for selectively oxidizing the carbon monoxide present in a mixture of gases, including hydrogen, to carbon dioxide is disclosed. Oxygen or an oxygen-containing gas mixture is introduced at locations along the latter portion of the reaction chamber in an isothermal reactor to selectively oxidize the carbon monoxide to carbon dioxide and to suppress the reverse to water-shift reaction, which produces carbon monoxide and water from carbon dioxide and hydrogen.

24 Claims, 8 Drawing Sheets

APPARATUS FOR THE SELECTIVE OXIDATION OF CARBON MONOXIDE IN A HYDROGEN-CONTAINING GAS MIXTURE

This is a division of application Ser. No. 07/959,070, filed Oct. 9, 1992, now U.S. Pat. No. 5,316,747.

FIELD OF THE INVENTION

The present invention relates to a method and apparatus for selectively oxidizing the carbon monoxide present in a mixture of gases, including hydrogen, to carbon dioxide. In the present invention, oxygen or an oxygen-containing gas mixture is introduced at locations along the latter portion of the isothermal reaction chamber containing catalyst to selectively oxidize the carbon monoxide to carbon dioxide and to suppress the reverse water-shift reaction, which produces carbon monoxide and water from carbon dioxide and hydrogen.

BACKGROUND OF THE INVENTION

Electrochemical fuel cells convert fuel and oxidant to electricity and reaction product. In electrochemical fuel cells employing hydrogen as the fuel and oxygen as the oxidant, the reaction product is water. Recently, efforts have been devoted to identifying ways to operate electrochemical fuel cells using other than pure hydrogen as the fuel. Fuel cell systems operating on pure hydrogen are generally disadvantageous because of the expense of producing and storing pure hydrogen gas. In addition, the use of liquid fuels is preferable to pure, bottled hydrogen in mobile and vehicular applications of electrochemical fuel cells.

Recent efforts have focused on the use of impure hydrogen obtained from the chemical conversion of hydrocarbon fuels to hydrogen. However, to be useful for fuel cells and other similar hydrogen-based chemical applications, hydrocarbon fuels must be efficiently converted to relatively pure hydrogen with a minimal amount of undesirable chemical byproducts, such as carbon monoxide.

Conversion of hydrocarbons to hydrogen is generally accomplished through the steam reformation of a hydrocarbon such as methanol in a reactor sometimes referred to as a reformer. The steam reformation of methanol is represented by the following chemical equation:

$$CH_3OH + H_2O + heat \leftrightarrows 3H_2 + CO_2 \qquad (1)$$

Due to competing reactions, the initial gaseous mixture produced by steam reformation of methanol typically contains from about 0.5% to about 20% by volume of carbon monoxide and about 65% to about 75% hydrogen, along with about 10% to about 25% carbon dioxide, on a dry basis (in addition, water vapor can be present in the gas stream). The initial gas mixture produced by the steam reformer can be further processed by a shift reactor (sometimes called a shift converter) to reduce the carbon monoxide content to about 0.2% to about 2%. The catalyzed reaction occurring in the shift converter is represented by the following chemical equation:

$$CO + H_2O \leftrightarrows CO_2 + H_2 \qquad (2)$$

Even after a combination of steam reformer/shift converter processing, the product gas mixture will have minor amounts of carbon monoxide and various hydrocarbon species, each present at about 1% or less of the total product mixture. A variety of conventional treatment processes may be employed to remove many of the hydrocarbon and acid gas impurities generated during the steam reformer/shift converter process. However, such conventional treatment methods are generally incapable of reducing the carbon monoxide content of the gases much below about 0.2%.

In low-temperature, hydrogen-based fuel cell applications, the presence of carbon monoxide in the inlet hydrogen stream, even at the 0.1% to 1% level, is generally unacceptable. In solid polymer electrolyte fuel cells, the electrochemical reaction is typically catalyzed by an active catalytic material comprising a noble metal such as platinum. Carbon monoxide adsorbs preferentially to the surface of platinum, effectively poisoning the catalyst and significantly reducing the efficiency of the desired electrochemical reaction. Thus, the amount of carbon monoxide in the hydrogen-containing gaseous mixture produced by a steam reformer/shift converter process for use in electrochemical fuel cells should be minimized, preferably to amounts significantly lower than the approximately 1% achieved using conventional steam reformation methods. The present selective oxidizing method and apparatus reduce the amount of carbon monoxide in a hydrogen-containing gas stream to a level suitable for use in electrochemical fuel cells.

In the present selective oxidizing method and apparatus, it is believed that at least three competing reactions occur, which are represented by the following chemical equations:

1. The desired oxidation of carbon monoxide to carbon dioxide:

$$CO + \tfrac{1}{2}O_2 \leftrightarrows CO_2 \qquad (3)$$

2. The undesired oxidation of hydrogen to water:

$$H_2 + \tfrac{1}{2}O_2 \leftrightarrows H_2O \qquad (4)$$

3. The undesired reverse water-shift reaction:

$$CO_2 + H_2 \leftrightarrows H_2O + CO \qquad (5)$$

In the presence of carbon monoxide (CO), the oxidation of carbon monoxide is the prevalent reaction. This is believed to be so because the carbon monoxide is preferentially absorbed by the oxidizing catalyst, thereby effectively preventing the hydrogen (H$_2$) from interacting with the catalyst to effect the other two undesired reactions (4) and (5) above. However, as the carbon monoxide (CO) becomes depleted along the length of the reaction chamber or catalyst bed, the hydrogen (H$_2$) and oxygen (O$_2$) react with the catalyst at a high rate (see reaction (4) above), thereby consuming the majority of the remaining oxygen. Then, in the oxygen-poor environment, the reverse water-shift reaction becomes prevalent, thereby increasing the concentration of carbon monoxide.

The oxidation of carbon monoxide (CO) is promoted by maintaining the temperature of the reactor within a desired range. Higher temperatures result in faster reaction rates, permitting the use of a smaller volume reactor but also promoting the undesired side reactions (4) and (5) above. Thus, an important factor in reactor design is to optimize the temperature of operation to provide a balance of activity (which affects reactor size) and selectivity (which affects the efficiency of eliminating carbon monoxide). At elevated reaction rates, effective heat exchange must also be provided so that the heat of reaction does not cause the reactor to overheat and adversely affect the balance of reactivity and selectivity (efficiency).

In the present selective oxidizing isothermal reactor, a fundamental component is the fin block, which is preferably formed from an aluminum casting containing a stainless steel tube coiled therein. The aluminum casting is machined in the general shape of a bowl, with the coil located at the base or bottom of the bowl.

The tubing coil, through which thermal fluid is directed, is preferably formed in the shape of two intermeshed spirals joined at their innermost ends, thereby forming a continuous path from the outside of one spiral, around the various coils of the first spiral, through a 180 degree bend into the innermost coil of the second spiral, around the various coils of the second spiral and finally exiting at the outside of the second spiral.

The concept of casting the coil into the aluminum block offers a simple, temperature-rated pressure boundary for thermal fluids. Other advantages include the good thermal conductivity and low density of aluminum, the low thermal resistance at the interface between the aluminum block and the stainless steel coil, and the accommodation of the differential thermal expansion coefficients between the two dissimilar metals.

As described in more detail below, the fin block is preferably bowl-shaped and contains a number of concentric circular grooves milled into the base of the bowl. Cylindrical aluminum fins are pressed into the grooves to create good thermal contact between the fin block and the fins. Each cylinder has a longitudinal gap, and is arranged such that the gap on each fin is 180 degrees from the gap on the adjacent fin(s). Thus, two continuous, symmetrical labyrinthine paths are formed from the smallest cylinder at the center of the bowl to the largest cylinder at the radially outermost portion of the bowl.

The volume between the fins forms the reaction chamber or catalyst bed, which is filled with pellets. In one embodiment, the active pellets comprise 0.3% platinum on alumina catalyst pellets interspersed with unplatinized, inert pellets in a ratio of about 1:2. The loading or concentration of catalyst on the active pellets can be varied along the length of the catalyst bed to achieve differing reaction rates. For example, the catalyst loading or concentration on active pellets can be gradually decreased to effect a lowering of the reaction rate in latter portions of the catalyst bed. In addition, the dilution of active pellets can be employed as a secondary mechanism to reduce catalyst concentration in order to control the reaction rate in any part of the catalyst bed, thereby insuring sufficient heat exchange capability to dissipate the heat of reaction.

When the fin block is loaded with catalyst, an aluminum air distribution plate is fastened over the top of the bowl, both to retain the catalyst pellets in the bed and to distribute the "secondary air". In a first embodiment, a number of secondary air injection ports are employed. The ports are located in orientations corresponding to selected gaps in the cylindrical fins. A closed-end porous stainless steel tube is preferably located inside the port to distribute oxygen-containing air along its length. Such a configuration provides a large surface area along which the air can enter the reactant stream, thereby promoting mixing and dilution prior to exposure to the catalyst.

In a second embodiment, oxygen-containing air is distributed at locations along the catalyst bed through a porous sheet formed of polytetrafluoroethylene (trade name "Teflon"). The air distribution plate on which the Teflon sheet is mounted has an annular recess on one face, undercut by a series of semicircular grooves. The grooves serve as air distribution channels which enable the air from the air inlet ports to be dispersed along the entire surface of the Teflon sheet (except for the area contacting semicircular ribs which support the Teflon sheet) installed within the annular recess. Upon assembly with the fin block, the Teflon sheet forms a semipermeable barrier between the air distribution channels and the catalyst bed, and induces a pressure differential across the Teflon sheet. The Teflon sheet also has the characteristic of enabling a predictable and repeatable gas flux in response to pressure differential. The Teflon sheet therefore evenly distributes air across the entire surface of the catalyst bed.

The aluminum fin block/air distribution plate assembly is encased in a pressure-rated housing. A stainless steel vessel secured with stainless steel flanges, tie rods and nuts is preferred. The aluminum reactor components are provided with clearance to expand both radially and axially within the stainless steel housing vessel in order to accommodate differences in the thermal expansion properties of the two metals. The tubing for the thermal fluid passes through the pressure boundary at some distance from the location at which it is embedded in the aluminum fin block in order to provide sufficient length of tubing to flex and absorb thermal deflections without imparting excess stress to the tubing.

It is envisioned that the selective oxidizing reactor will share a common, welded vessel with other reactors, such as the steam reformer and shift conversion reactor, in the overall fuel cell based power generation system.

The present isothermal reaction method and apparatus thus satisfy the following requirements:

effective turbulent flow over the catalyst pellets;

containment of the catalyst pellets in a pressurized gaseous environment efficient heat transfer to and from the catalyst pellets; and addition and mixing of oxygen in the latter part of the reaction chamber containing the catalyst.

The overall arrangement of the aluminum reactor inside a stainless steel shell provides the following advantages:

the aluminum reactor housing is light weight and provides effective thermal conductivity;

the stainless steel shell is able to withstand the stress developed by the pressurized gases within the reactor and also resists corrosion, both of which are particularly problematic at elevated temperatures.

Accordingly, it is an object of the present invention to provide a method and apparatus for the selective oxidation of carbon monoxide to carbon dioxide in a hydrogen-containing gaseous mixture.

It is also an object of the invention to provide an apparatus and a method for the selective oxidation of carbon monoxide in a hydrogen-containing gas mixture by introducing oxygen or an oxygen-containing gas mixture at various locations along the reaction pathway to counteract the reverse water-shift reaction, which produces carbon monoxide in the absence of oxygen.

It is a further object of the invention to provide method for the selective oxidation of carbon monoxide over a wide range of reactant volume flow rates.

It is a still further object of the invention to provide a hydrogen-containing reformate gas mixture having carbon monoxide concentrations sufficiently low so as to be suitable for use in applications such as electrochemical fuel cells and other applications employing catalysts that would be adversely effected by higher carbon monoxide concentrations.

SUMMARY OF THE INVENTION

The above and other objects are achieved by a method and apparatus for selectively oxidizing the carbon monoxide present in a mixture of gases, including hydrogen, to carbon dioxide. The method involves the selective oxidation of carbon monoxide to carbon dioxide where the carbon monoxide is present in a gaseous mixture comprising hydrogen, carbon dioxide and carbon monoxide. Water vapor can also be present in the gaseous mixture. The method comprises the steps of:

introducing a first amount of oxygen-containing gas into the gaseous mixture;

contacting the gaseous mixture with a catalyst in a reaction chamber having an inlet, the catalyst promoting the oxidation of carbon monoxide to carbon dioxide; and introducing a further amount of oxygen or an oxygen-containing gas mixture into the reaction chamber through at least one secondary inlet located between the inlet and the outlet.

The method also involves suppressing the reverse water-shift reaction in a chemical reactor for oxidizing carbon monoxide to carbon dioxide. The carbon monoxide is present in a gaseous mixture comprising hydrogen, carbon dioxide and carbon monoxide. The reactor comprises a reaction chamber having an inlet and an outlet, the catalyst promoting the oxidation of carbon monoxide to carbon dioxide. The method comprises:

introducing a first amount of oxygen-containing gas into the gaseous mixture;

introducing the gaseous mixture into the reaction chamber; and introducing a further amount of oxygen or an oxygen-containing gas mixture into the reaction chamber through at least one secondary inlet located between the inlet and the outlet.

In the preferred methods, a plurality of secondary inlets are located between the inlet and the outlet. The catalyst is preferably adsorbed onto pellets to form active pellets. The concentration of catalyst on the active pellets is varied among different portions of the reaction chamber to vary the rate of oxidation among the different portions. The active pellets can also be mixed with inert pellets in at least one portion of the reaction chamber to decrease the concentration of active catalyst in those portions, so that the rate of oxidation is correspondingly decreased in those portions.

In one embodiment, the apparatus for selectively oxidizing the carbon monoxide present in a mixture of gases, including hydrogen, to carbon dioxide comprises:

(a) a gas distribution plate;

(b) a fin block adjacent the gas distribution plate, the fin block comprising a base and a plurality of heat transfer surfaces extending from the base toward the gas distribution plate, the heat transfer surfaces joining with the gas distribution plate to form a labyrinthine channel therebetween, the labyrinthine channel having an inlet and an outlet, the base including in its interior portion at least one channel for circulating a thermal fluid therethrough for supplying heat to or removing heat from the reactor, thereby maintaining the reactor substantially isothermal, the labyrinthine channel having catalyst pellets disposed therein for promoting oxidation.

The gas distribution plate has a plurality of ports formed therein for introducing an oxygen-containing gas into the labyrinthine channel at a plurality of locations along the labyrinthine channel. Reactant gas introduced into the labyrinthine channel inlet is catalytically oxidized as it travels toward the labyrinthine channel outlet.

In the preferred first embodiment, the reactor preferably comprises a plurality of porous metal tubes extending from the ports of the air distribution plate into the labyrinthine channel for introducing the oxygen-containing gas into the labyrinthine channel. In the first embodiment, the reactor preferably further comprises a plurality of porous metal tubes extending from the ports of the air distribution plate into the labyrinthine channel, at the location of the fin axial slots, for introducing the oxygen-containing gas into the labyrinthine channel.

In another embodiment, the apparatus comprises:

(a) a gas distribution plate;

(b) a fin block adjacent the gas distribution plate, the fin block comprising a base and a plurality of heat transfer surfaces extending from the base toward the gas distribution plate, the heat transfer surfaces joining with the gas distribution plate to form a labyrinthine channel therebetween, the labyrinthine channel having an inlet and an outlet, the base including in its interior portion at least one channel for circulating a thermal fluid therethrough for maintaining the reactor substantially isothermal, the labyrinthine channels having catalyst pellets disposed therein for promoting oxidation.

The gas distribution plate has a recess formed in the surface thereof facing the fin block. The gas distribution plate further comprises a sheet of porous, gas permeable material adapted to be received in the recess and at least one port formed in the gas distribution plate. The port is in fluid communication with the sheet of porous, gas permeable material for introducing an oxygen-containing gas into at least a portion of the labyrinthine channel through the sheet of porous, gas permeable material. Reactant gas introduced into the labyrinthine channel inlet is catalytically oxidized as it travels toward the labyrinthine channel outlet.

In the preferred second embodiment, the recess and the sheet of porous, gas permeable material are annularly shaped. The porous, gas permeable material preferably consists essentially of polytetrafluoroethylene.

In the preferred embodiments, the reactant gas is a gaseous mixture comprising hydrogen and carbon monoxide, and the reactor catalytically oxidizes at least a portion of the carbon monoxide to carbon dioxide. The preferred gas distribution plate has a centrally disposed inlet port formed therein for introducing reactant gas into the radially innermost portion of the labyrinthine channel and the fin block has an outlet port formed therein for removing reaction product gas from the radially outermost portion of the labyrinthine channel. The thermal fluid channel is preferably a coiled tube having an inlet and an outlet and wherein the fin block is formed of cast metal; a substantial portion of the coiled tube between the thermal fluid inlet and outlet being cast in place within the interior portion of the fin block base. The fin block is preferably formed of cast aluminum and wherein the coiled tube is formed of stainless steel.

In the preferred embodiments, the reactor further comprises:

(c) a first end plate adjacent the fin block on the side opposite the gas distribution plate;

(d) a second end plate adjacent the gas distribution plate on the side opposite the fin block, the second end plate comprising a plurality of ports in fluid communication with the plurality of ports formed in the gas distribution plate;

(e) a containment shell interposed between the first end plate and the second end plate, the containment shell circumscribing the fin block and the gas distribution plate; and (f) means for consolidating the containment shell, the first end plate and the second end plate into a pressure-tight assembly for containing the fin block and the gas distribution plate.

The containment shell, first end plate and second end plate are preferably formed of stainless steel. The second end plate and gas distribution plate each preferably have a centrally disposed inlet port formed therein for introducing reactant gas into the radially innermost portion of the labyrinthine channel. The fin block and containment shell each preferably has an outlet port formed therein for removing reaction product gas from the radially outermost channel of the labyrinthine channel.

The preferred fin block has a plurality of substantially concentric circular grooves formed therein on the surface facing the gas distribution plate. The heat transfer surfaces comprise a plurality of substantially cylindrical fins, each of the fins having an axial slot formed therein, the fins mounted within the grooves so that the fins are in thermal contact with the fin block. The fins join with the gas distribution plate to form the labyrinthine channel. The substantially cylindrical fins are preferably mounted in the grooves in the fin block such that the axial slots in adjacent fins are disposed about 180 degrees apart, such that the fins join with the gas distribution plate to form a labyrinthine channel comprising a plurality of concentric arcuate segments. The substantially cylindrical fins are preferably formed from aluminum or copper.

The preferred catalyst pellets comprise platinum supported on alumina. The concentration of catalyst (i.e., weight of catalyst per unit pellet volume or weight of catalyst per unit pellet surface area) is preferably varied among various portions of the reaction chamber to control the reaction rate in those portions. The catalyst pellets containing catalyst can also be mixed with inert pellets in at least one portion of the labyrinthine channel to decrease the concentration of active catalyst in those portions, so that the rate of oxidation is correspondingly decreased in those portions.

DETAILED DESCRIPTION OF THE PREFERRED EMBODIMENTS

Figure 1:
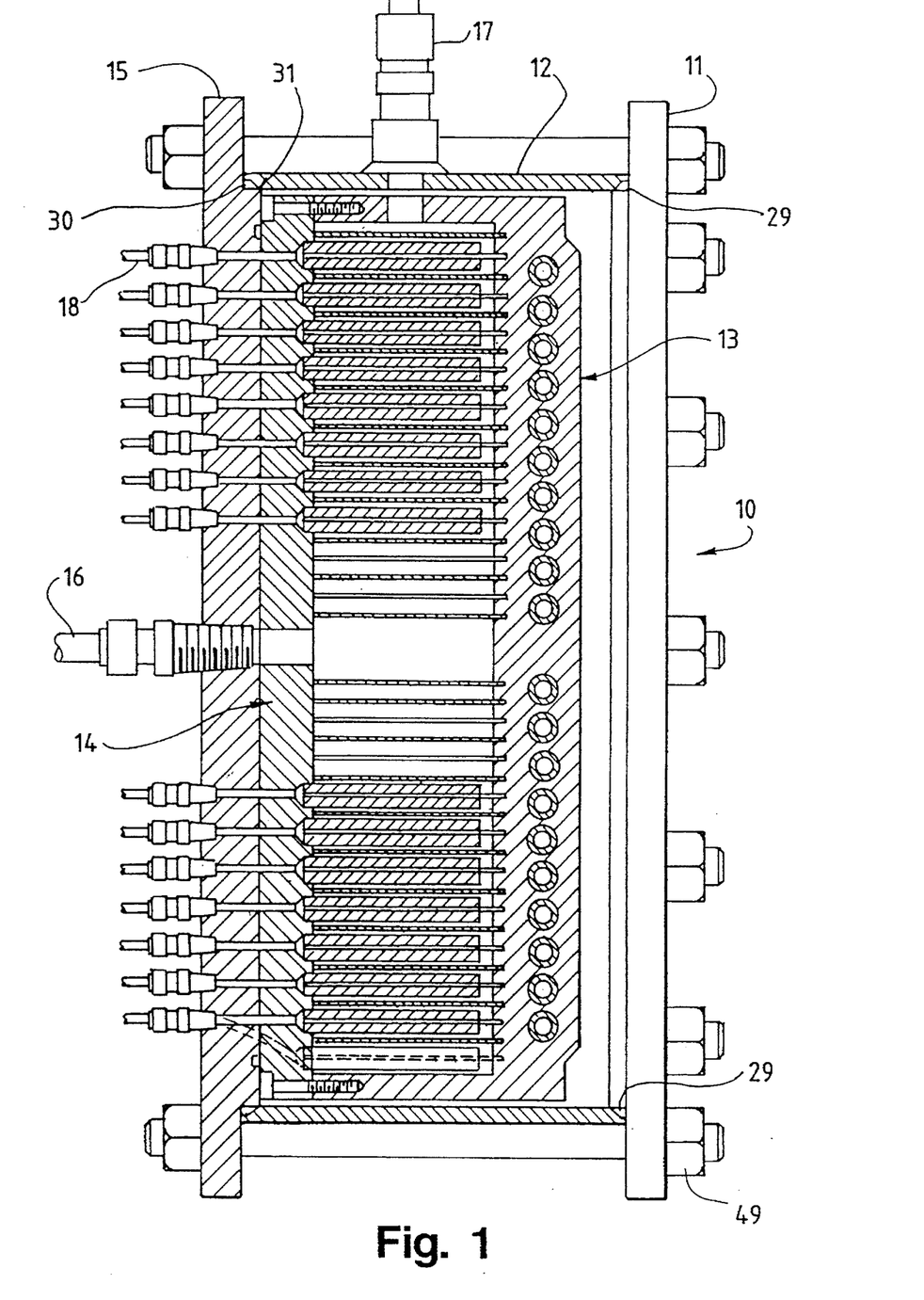
FIG. 1 is a side sectional view of one embodiment of the selective oxidizing reactor of the present invention showing the major components in an assembled configuration.

Referring now to FIG. 1, a side sectional view of a first embodiment of the selective oxidizing reactor, designated generally as reactor 10, is illustrated. The reactor comprises a first end plate 11, a reactor containment shell 12, a fin block 13, an air or gas distribution plate 14, and a second end plate 15. Also illustrated in FIG. 1 are a reactant gas inlet port 16, a product gas outlet port 17, and a plurality of secondary air inlet ports, one of which is illustrated as air inlet port 18.

The end plates 11 and 15 are preferably flanged and dished to permit the use of thinner-walled material, but they can be flat as shown in FIG. 1. The preferred material for the end plates and the reactor containment shell 12 is stainless steel, although it is possible to use non-metallic materials such as graphite, or ceramic materials such as silicon nitride. Tie rods (not shown) and nuts 49 for consolidating the assembly are also preferably formed of stainless steel.

Figure 2:
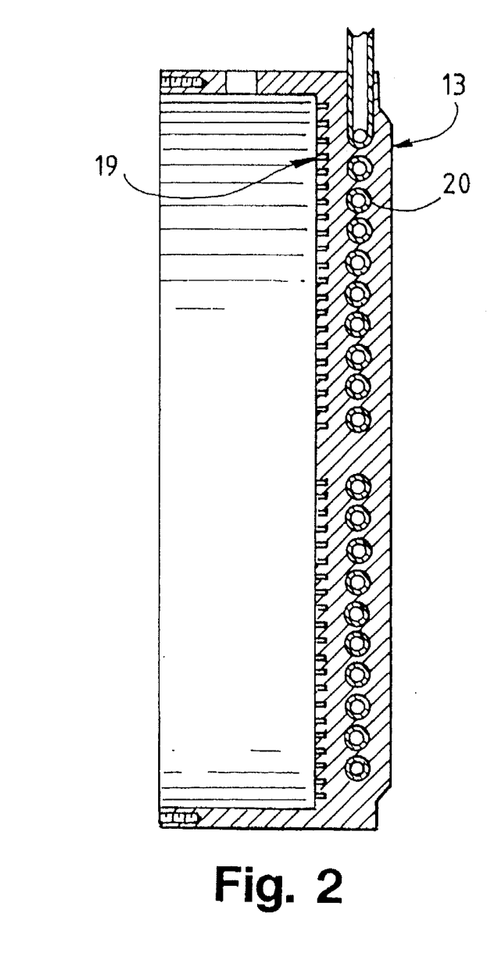
FIG. 2 is a side sectional view of the fin block portion of the selective oxidizing reactor of FIG. 1 showing the coiled tubing for circulating a thermal fluid through the fin block.

Referring now to FIG. 2, a side sectional view of the fin block 13 is illustrated. The primary functions of the fin block 13 are:

- to provide a space-efficient and weight-efficient container for the catalyst material; lightweight materials and a bowl-shaped configuration are therefore employed.
- to contain the pressurized thermal fluid at high temperature; stainless steel tubing is therefore employed to carry the thermal fluid;
- to provide effective heat exchange from the reactant gases to the thermal fluid (and vice versa); aluminum components, extended heat transfer surfaces on the gas side, and a labyrinthine path are therefore employed.

Significantly, the fin block 13 does not contain reactant gas pressure within the reactor, thus providing the fin block 13 with thinner, more effective heat transfer surfaces; such reactant gas pressure containment is accomplished by the containment shell 12.

Figure 3:
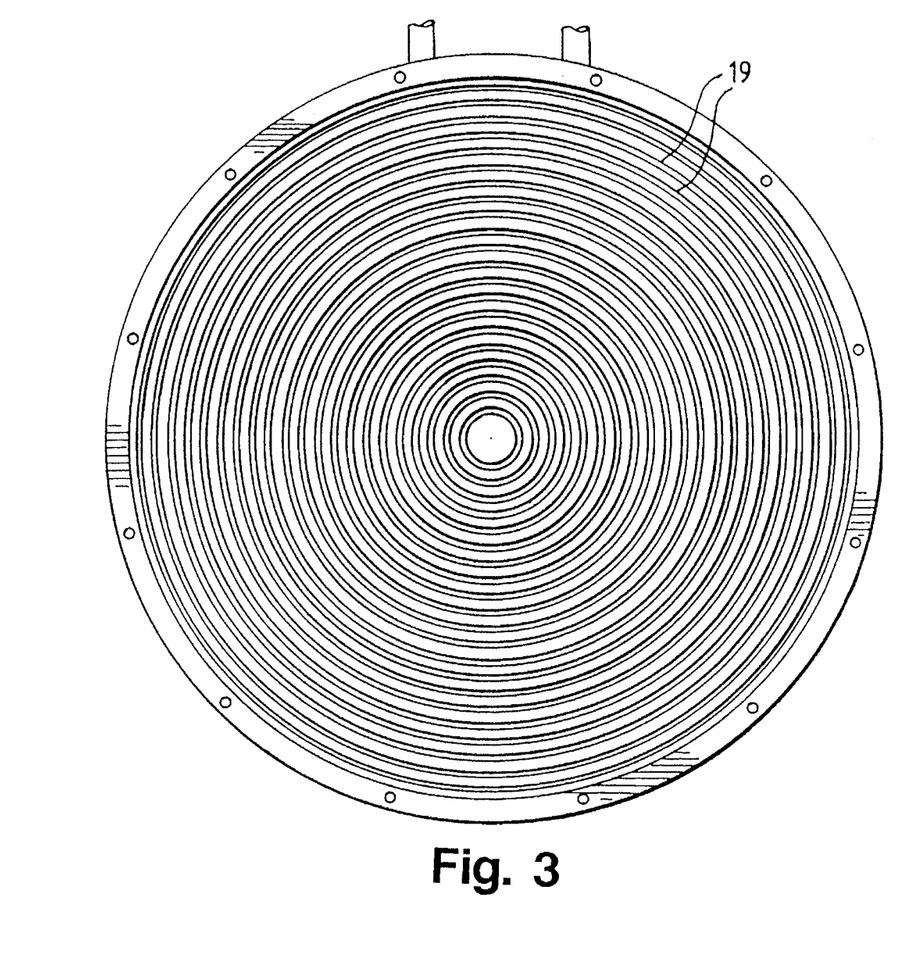
FIG. 3 is a top plan view of the fin block showing an array of concentric circular grooves cut in the interior facing surface of the fin block for mounting the cylindrical fins.
Figure 4:
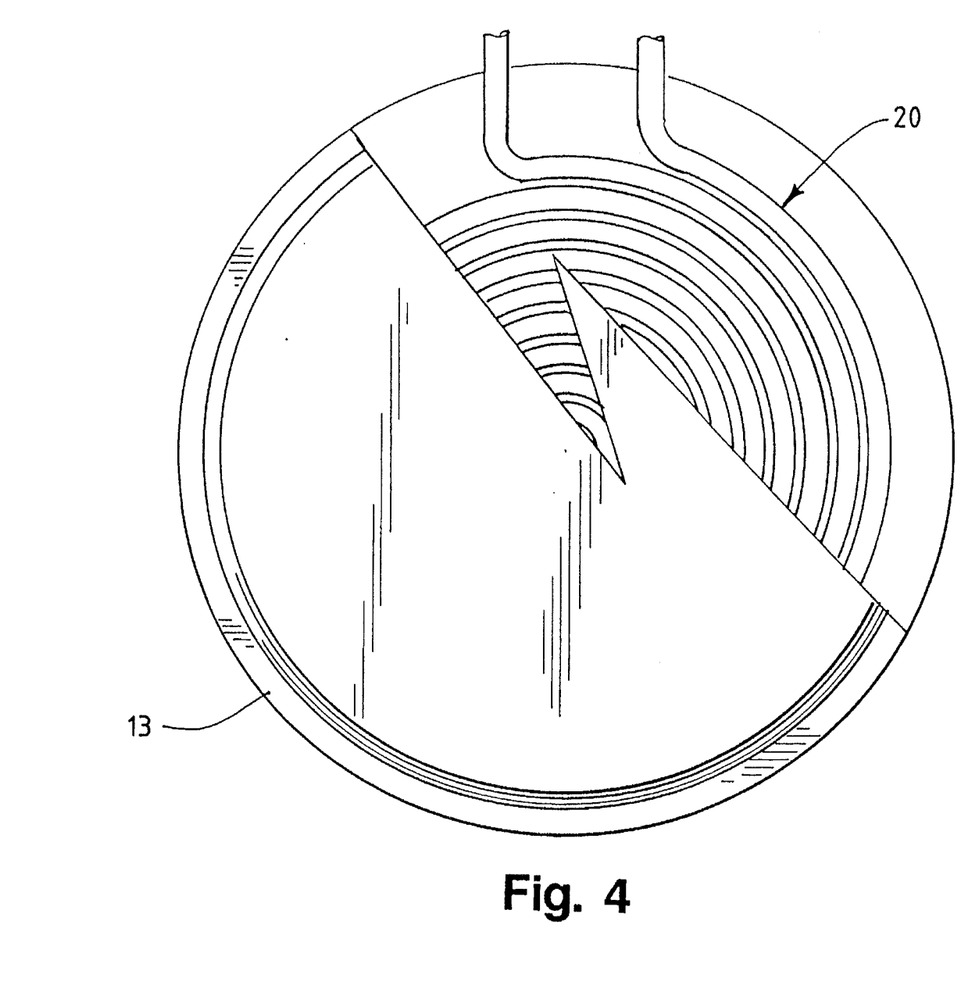
FIG. 4 is a partial cutaway end view of the fin block showing the coiled tubing, cast within the fin block, for circulating a thermal fluid.

The fin block 13 has an approximately bowl-shaped or C-shaped configuration. An array of concentric circular grooves 19 are cut into the interior facing surface of the fin block 13, as illustrated in FIG. 3. The fin block 13 preferably is made from an aluminum casting that contains a preformed coil of tubing 20, preferably formed of stainless steel, cast directly in place into the fin block 13. The tubing 20 forms a spiral that double backs upon itself from its center point giving the appearance of two intermeshed tubing spirals. A section of the coiled tubing 20 is illustrated in FIG. 4, a partial cutaway illustration of the fin block 13.

The coiled tubing 20 can also be seen in the cross-sectional view of the fin block 13, illustrated in FIG. 2. The tubing for the thermal fluid passes through the pressure boundary of the reactor at some distance from the point at which it is embedded in the fin block. This is to ensure that there is sufficient free length of tubing to allow flexing of the tubing and the absorption of thermal deflections without causing excessive stress.

Casting the coil into the aluminum block offers a simple, temperature-rated pressure boundary for thermal fluids carried by tubing 20. Additional advantages stem from the thermal conductivity and low density of aluminum, the low-resistance thermal interface between the aluminum block and the steel coil, and an accommodation of the differences in thermal expansion between the dissimilar metals.

Figure 5:
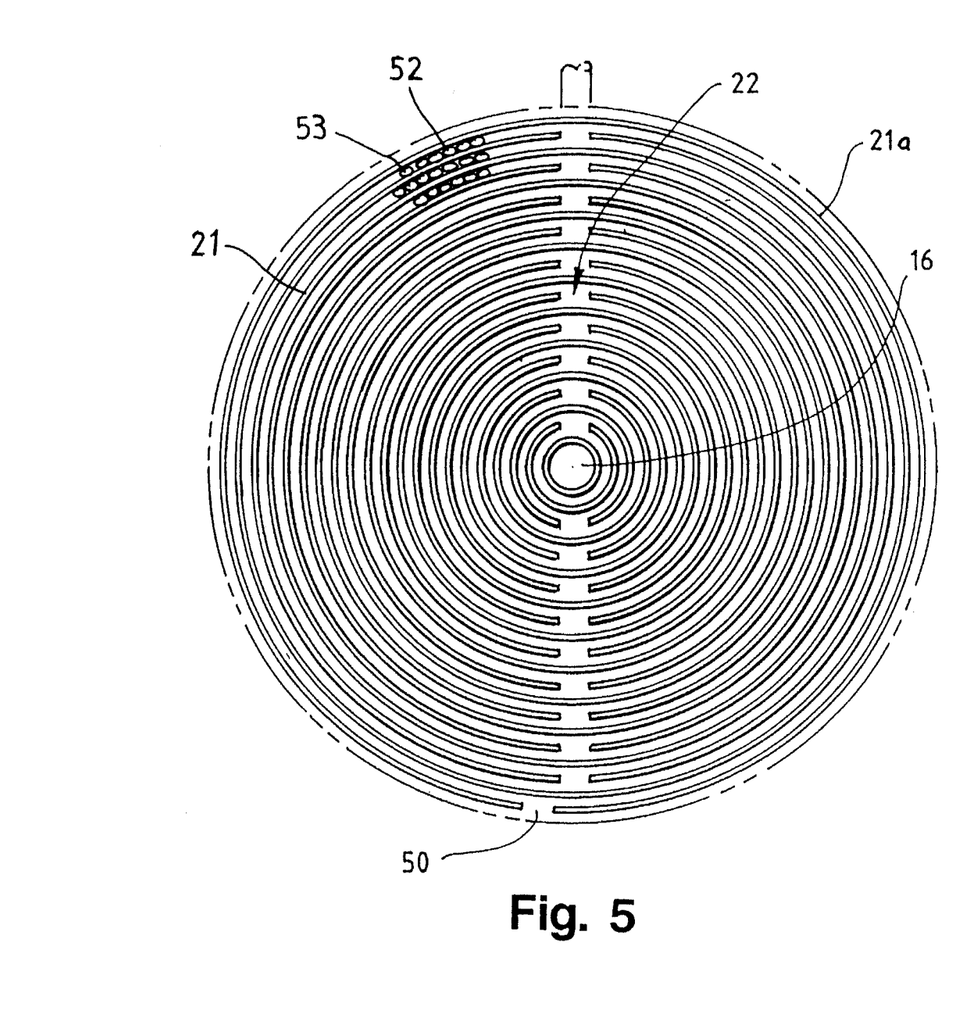
FIG. 5 is a top plan view of the cylindrical fins inserted into the concentric circular grooves cut into the interior facing surface of the fin block illustrated in FIG. 3.
Figure 6:
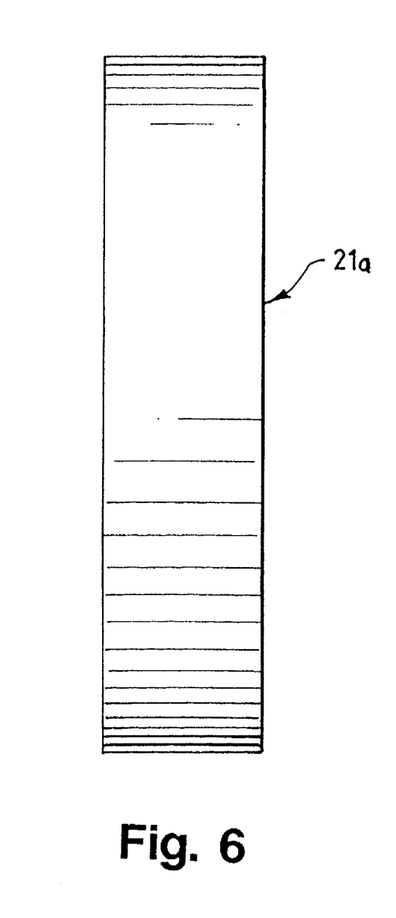
FIG. 6 is a side view of the outermost cylindrical fin.

Referring now to FIG. 5, an array of cylindrical fins 21 are pressed into the concentric circular grooves 19 cut into the interior facing surface of the fin block 13. FIG. 6 shows a side view of the outermost cylindrical fin 21a. The fins 21 are pressed into grooves 19 of fin block 13 (shown in FIGS. 2 and 3) so as to create good thermal contact between the fin block and the fins. Each fin 21 has a longitudinal gap. The cylindrical fins 21 are arranged in the fin block 13 so that the gap on one fin is 180 degrees removed from the gap on the neighboring fins. This arrangement creates a pattern, as illustrated in FIG. 5, of mirror-image arcuate sections of the labyrinthine channel 22 formed from the smallest cylindrical fin to the largest cylindrical fin. The cylindrical fins 21 are preferably formed from aluminum, but other thermally conductive metals such as copper could be used as well.

The cylindrical fins 21 act as heat transfer surfaces for the transfer of heat between the thermal fluid circulating through the fin block 13 and the catalyst bed within the labyrinthine channel 22. The catalyst bed is typically formed from a mixture of catalyst pellets interspersed with inert pellets packed within the channel 22. By providing a relatively long and narrow reactant path in the labyrinthine channel 22, with minimal cross-sectional area, the semicircular configuration of the channel, as illustrated in FIG. 5, increases the linear velocity of the reactants for a given space velocity. As a result, the boundary-layer thickness along the reactant path walls is reduced, thereby improving heat transfer and mixing of the reactants and, ultimately, conversion of the reactants to products.

Linear velocity refers to the velocity of a given "plug" of reactant molecules through the reactor, and may be expressed in terms of ft/hr. Space velocity (S) represents the number of reactant plug changes within a given volume over a given period of time, and may be calculated as:

$$S = (\text{Flow rate of reactants, ft}^3/\text{hr})/(\text{Reactor volume, ft}^3).$$

The units of space velocity are inverse time, i.e., $hr^{-1}$. The selective oxidizing reactor of the present invention is a plug flow type reactor. Ideally, in a plug flow reactor there is complete mixing of fluids in the radial direction and no diffusion in the flow direction (i.e., no back mixing). The reactor of the present invention is also designed to operate under constant temperature (i.e., isothermal) conditions.

The volume between the fins 21 are filled with a mixture of catalyst-loaded pellets 52 (not shown in FIG. 1) interspersed with inert pellets 53. A typical catalyst composition would be 0.3 weight % platinum on alumina, interspersed with unplatinized, inert alumina pellets, in a ratio of about 1:2. The dilution of active pellets is employed as a mechanism to control the reaction rate in any part of the bed and to insure sufficient heat exchange capability to dissipate the heat generated within the catalyst bed. As previously discussed, the loading or concentration of catalyst on active pellets can be varied along the length of the catalyst bed to achieve differing rates. For example, a gradual decrease of the catalyst loading on active pellets will effect a lowering of the reaction rates in the latter, downstream portions of the catalyst bed. The ratio of active pellets to inert pellets can also be varied in different parts of the bed to control reaction rates along the length of the catalyst bed.

Figure 7:
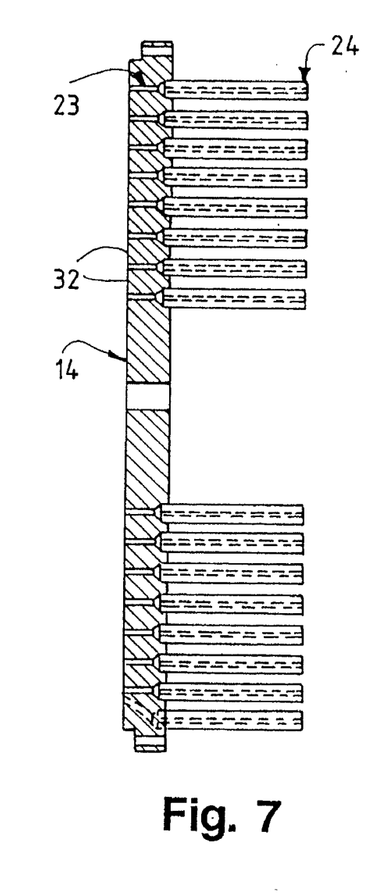
FIG. 7 is a side sectional view of the air distribution plate assembly of the selective oxidizing reactor of FIG. 1, showing the porous metal tubes used to distribute secondary air throughout the reaction pathway in the reactor.

When the labyrinthine channel 22 has been loaded with catalyst and inert pellets, the air distribution plate 14 is fastened over the top of the bowl-shaped fin block 13 as a means to consolidate the fin block assembly and retain the pellets within the assembly. As illustrated in FIG. 7, the air distribution plate 14 contains a plurality of access passages 23 through which flows secondary air from the secondary air inlet ports 18 into the labyrinthine channels 22 created by the fins 21 in the fin block 13. Secondary air passes through these passages 23 and into porous metal tubes 24, also shown in FIG. 7. The porous metal tubes 24 distribute the secondary air into the labyrinthine channel 22 formed between the surfaces of the fins 21 in the fin block 13. In this manner, the secondary air is distributed at various locations along the channel 22 carrying the reactant gases. A plurality of secondary air access passages 23, as illustrated in FIG. 7, is preferred for introducing secondary air into the porous metal tubes 24.

Figure 9:
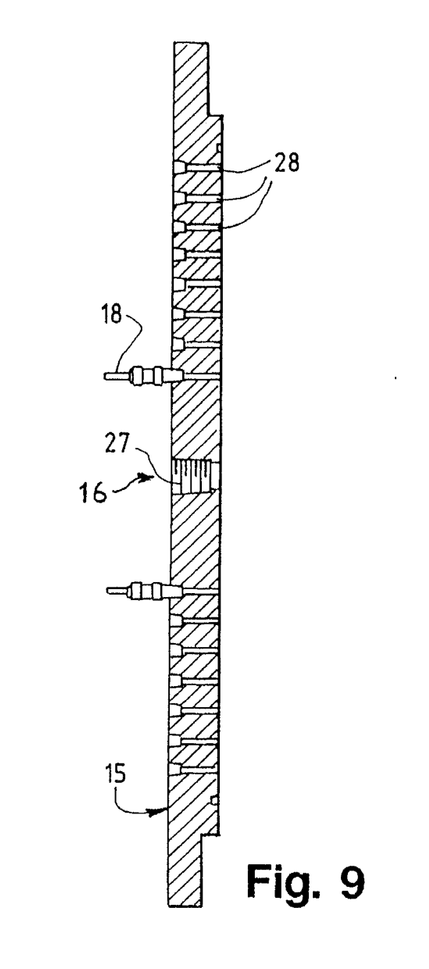
FIG. 9 is a side sectional view of the second end plate of the selective oxidizing reactor of FIG. 1, showing the positions of gas inlet port openings.

Referring now to FIGS. 7 and 9, it can be seen that the first of the secondary air inlet ports 18 is located some distance radially from the central portion of the reactor. The radial distance is preferred because the initial charge of reactant gas molecules to the reactor 10 through the reactant gas inlet port 16 (not shown in FIGS. 7 and 9) contains a thoroughly mixed stoichiometric portion of primary air. Therefore, there is no need for additional secondary air when the reactant molecules first begin to diffuse through the catalyst bed. When the charge of reactant molecules begins to diffuse radially outward from the central portion of the reactor 10, it encounters the first of the secondary air inlet ports 18. The secondary air inlet ports are distributed symmetrically along either side of the reactant gas inlet port 16 because the reactant molecules diffuse radially outward in both directions from the center of the reactor. Thus each secondary air inlet port provides secondary air through porous tubes 24 to one half of the volume of any one arcuate section formed by the cylindrical fins 21. The secondary air reacts with the feed stock reactant molecules as they diffuse through the labyrinthine channel 22. As the charge or plug of reactant molecules moves radially outward from the center of the reactor, it reaches the outermost arcuate channel 22 which has a single opening 50 through which the product molecules pass out of the reactor 10.

Figure 8:
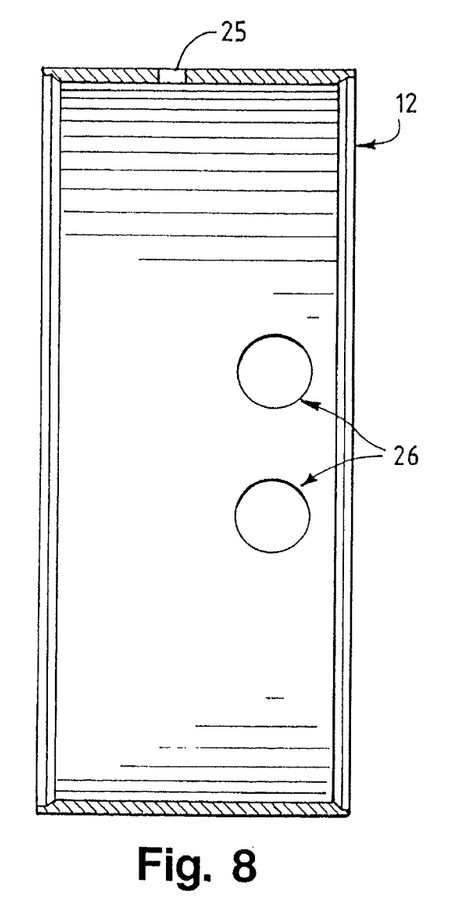
FIG. 8 is a side view of the containment shell for the selective oxidizing reactor of FIG. 1.

FIG. 8 illustrates the containment shell 12 into which the fin block/air distribution plate assembly is placed. The containment shell 12 has an opening 25 to accommodate the product gas outlet port 17, shown in FIG. 1. The containment shell 12 also has two tubing access openings 26 positioned approximately 90 degrees from the product gas outlet port opening 25 to allow access for the input and output ends of the coiled tubing 20, previously illustrated in FIG. 4, which contains the circulating thermal fluid used to control temperature within the reactor 10. FIG. 9 illustrates a second end plate 15, which has a central access opening 27 which is fluidly connected to reactant gas inlet port 16 through which reactant gases enter into the central portion of the labyrinthine channel 22 formed by the fins 21 in the fin block 13. In addition, the second end plate 15 has a number of gas inlet port openings 28 fluidly connected with access passages 23 in the air distribution plate 14. Access passages 23 in turn connect with porous metal tubes 24 to introduce secondary air at various points along the labyrinthine channel 22 in the reactor 10.

A number of o-rings are used in various locations within the reactor assembly 10 to provide pressure seals between individual components within the assembly 10. As shown in FIG. 1, an o-ring 29 is positioned between the first end plate 11 and the reactor containment shell 12, thereby providing a seal at the junction of end plate 11 and containment shell 12. A second o-ring 30 is similarly situated on the corresponding surfaces of the second end plate 15 and the reactor containment shell 12, thereby providing a seal at the junction of end plate 15 and containment shell 12.

As further illustrated in FIG. 1, an additional o-ring 31 is positioned between the air distribution plate 14 and the second end plate 15, thereby providing a seal at the junction of air distribution plate 14 and end plate 15. FIG. 7 illustrates the position of o-rings 32 in the air distribution plate 14 at the boundary between the access passages 23 of the air distribution plate 14 and the gas inlet port openings 28 in the second end plate 15. O-rings 32 provide a pressure seal for the path of secondary air between the secondary air inlet ports 18 and the porous metal tubes 24.

During operation, the feed stock gas mixture enters the selective oxidizing reactor 10 at reactant gas inlet port 16, as shown in FIG. 1, entering inlet port 16 at the central portion of the reactor 10 and flowing through the labyrinthine channel 22. Once entering the labyrinthine channel 22, the reactant gas mixture diffuses through the catalyst bed along the channel 22 in a manner which takes it from the central arcuate passage outward in a radial direction toward the inner surface of the reactor containment shell 12. As the charge of reactant molecules passes along the labyrinthine channel 22 within the reactor 10, oxygen is consumed, both by the desired reaction (the oxidation of carbon monoxide (CO) to carbon dioxide ($CO_2$), and by the undesired competing water shift reaction (the oxidation of hydrogen ($H_2$) to water ($H_2O$)). At reactant flow rates well below the design maximum, the carbon monoxide (CO) and oxygen ($O_2$) are substantially consumed in the first portion of the catalyst bed. In the absence of oxygen ($O_2$), the carbon dioxide ($CO_2$) is slowly reduced by the hydrogen in the reverse water-shift reaction, thereby generating additional, undesired carbon monoxide (CO). As the charge of reactant molecules encounters gas inlet port openings 28 of the second end plate 15 (see FIG. 9), the reactant molecules mix with the molecules of secondary air. In the selective oxidizing reactor shown in FIG. 1, the secondary air molecules diffuse through porous metal tubes 24 into one of the arcuate passages of the labyrinthine channel 22. The resulting mixture has a higher concentration of oxygen ($O_2$) than before encountering the secondary air port, thereby effectively suppressing the reduction of carbon dioxide ($CO_2$) by the reverse water-shift reaction, and enabling the carbon monoxide (CO) to be reoxidized to carbon dioxide ($CO_2$). This process continues as the charge or plug of molecules continues along the channel.

The embodiment illustrated in FIG. 9 contemplates a plurality of secondary air inlet ports 18, each one bringing secondary air molecules into contact with the plug of feed stock reactant molecules in different arcuate sections of the labyrinthine channel 22 within the reactor 10, each at a different distance radially from the center of reactant gas inlet port 16, and hence, each further along the channel 22.

When the charge or plug of reactant gas molecules reaches the outermost arcuate section of the labyrinthine channel 22, it then passes through the only opening in the heat exchange surfaces (fins 21) that define the outermost boundary of the labyrinthine channel 22. The reactant gases also pass through the wall of the fin block 13. Once having passed through the opening 50 in the outermost fin 21, the charge of reactant gas molecules exits the reactor through the product gas outlet port 17.

Figure 10:
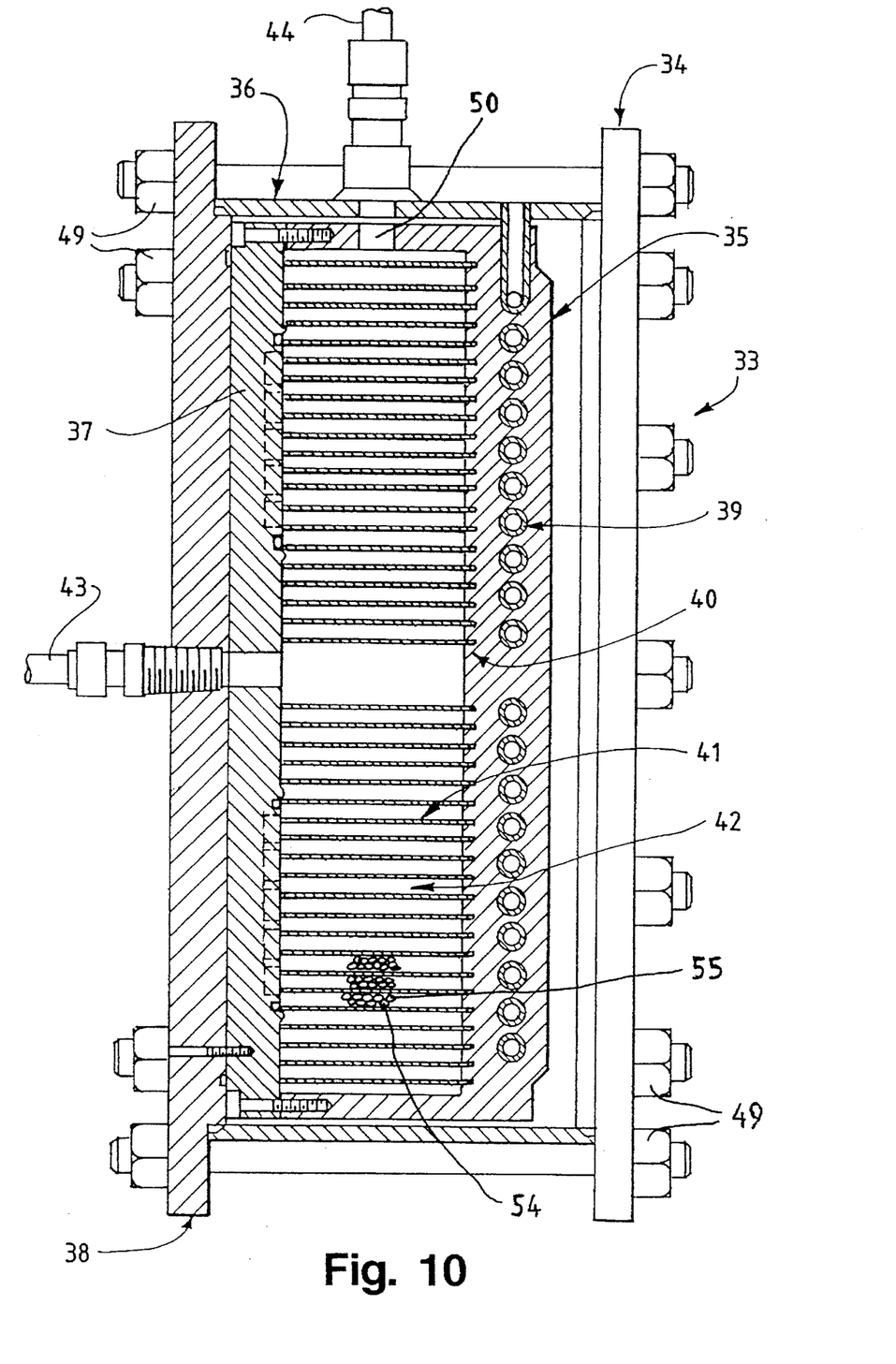
FIG. 10 is a side sectional view of a second embodiment of the selective oxidizing reactor of the present invention showing the major components in an assembled configuration.

A second embodiment of the selective oxidizing reactor, shown in a side sectional view, is illustrated in FIG. 10. This embodiment, referenced generally as reactor 33, comprises a first end plate 34, a fin block 35, a reactor containment shell 36, an air or gas distribution plate 37, and a second end plate 38.

The fin block 35 is constructed in a manner substantially identical to that previously described above for the fin block 13 of the selective oxidizing reactor 10 illustrated in FIGS. 1–4. The fin block preferably is made from an aluminum casting containing coiled tubing 39, which contains a circulating thermal fluid to control the temperature within the reactor assembly 33. Concentric circular grooves 40 are cut in the interior surface of the fin block 35, and fins 41, preferably formed of aluminum, are pressed into the grooves 40 to create a labyrinthine channel 42 between the fins 41. As in reactor 10 described above, the labyrinthine channel 42 created by the fins 41 is filled with both catalyst-loaded pellets 54 and inert pellets 55.

As further illustrated in FIG. 10, the second end plate 38 contains a centrally located reactant gas inlet port 43 for the introduction of reactant gases into the central portion of the labyrinthine channel 42 formed by the aluminum fins 21 within the reactor 33. Containment shell 36 also contains a product gas outlet port 44 that allows the product gases to be withdrawn from the outermost arcuate section of the labyrinthine channel 42 inside the reactor 33.

Figure 11:
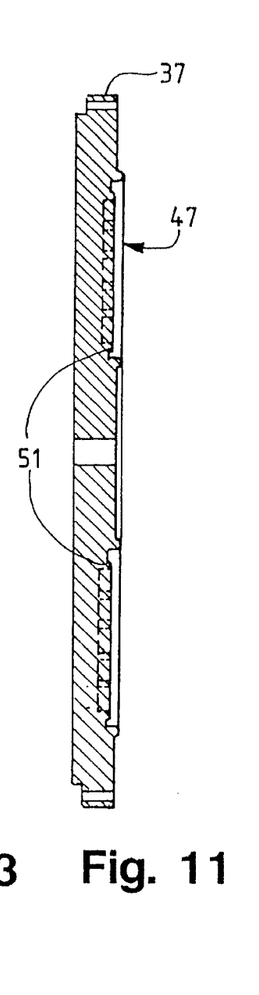
FIG. 11 is a side sectional view of the air distribution plate of the selective oxidizing reactor of FIG. 10.
Figure 12:
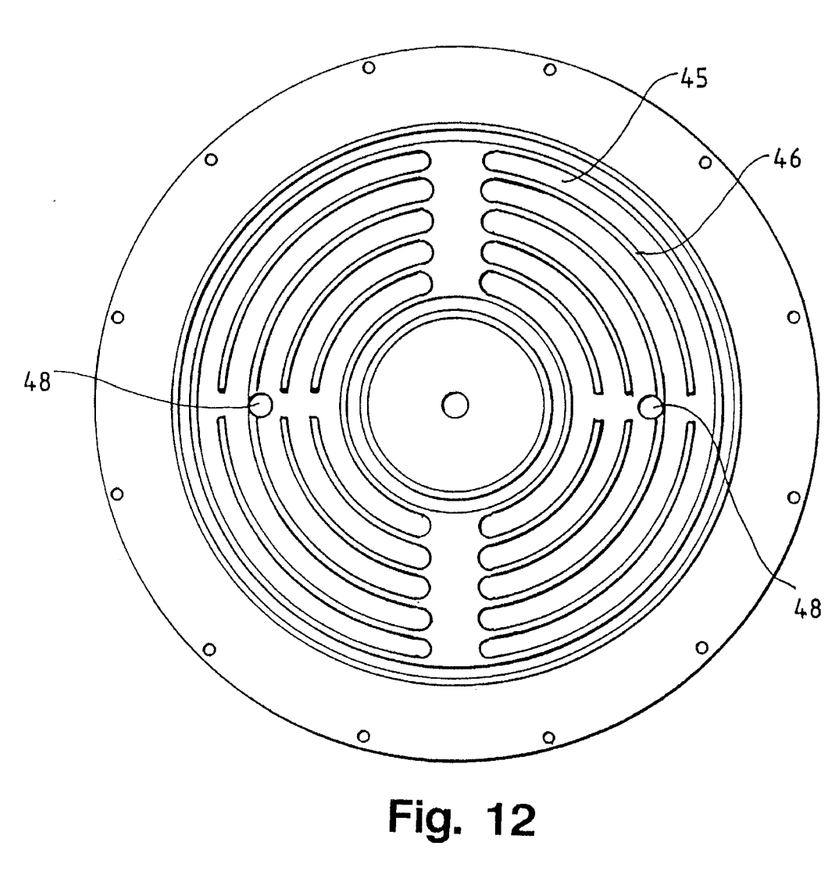
FIG. 12 is a top plan view of the air distribution plate of FIG. 11, showing the pattern of semi-circular grooves and ridges cut into the interior surface of the plate.
Figure 13:
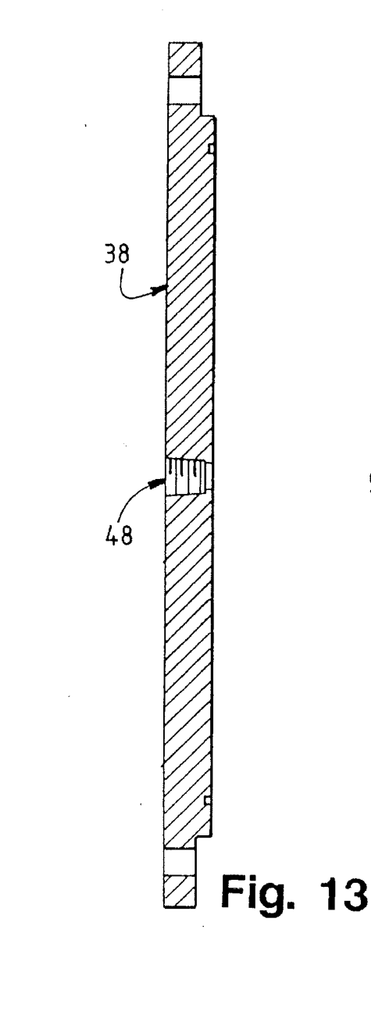
FIG. 13 is a side sectional view of the second end plate of the selective oxidizing reactor of FIG. 10.

Referring now to FIG. 11, the air distribution plate 37 of selective oxidizing reactor 33 contains annular recess 51 on the interior surface of air distribution plate 37. The annular recess 51 is undercut by a series of semi-circular grooves 45, creating raised ridges 46 between the grooves, as illustrated in FIG. 12. These grooves 45 serve as air distribution channels for secondary air. The ridges form raised portions between the grooves 45. A flat, ring-shaped porous Teflon sheet 47 rests on the ridges within the annular recess 51 on the surface of the air distribution plate 37. This porous Teflon sheet 47 forms a barrier between the grooves 45 cut into the interior surface of the air distribution plate 37, and the pellets contained within the labyrinthine channel 42 in the fin block 35. Air is injected into ports (not shown in FIGS. 11–13) which open into the grooves 45 in the air distribution plate 37 through openings 48, as shown in FIG. 12. As in selective oxidizing reactor 10, described above, there is no need to introduce secondary air where the reactant molecules, already proportioned with primary air, first enter the reactor 33. Instead, it is preferable to introduce secondary air into the labyrinthine channel 42 as the reactant molecules begin to diffuse through the pellets in the labyrinthine channel 42 and radially outward toward the outer arcuate sections of the labyrinthine channel 42 in the reactor 33.

The semicircular grooves 45 in the air distribution plate 37, illustrated in FIG. 12, distribute the secondary air over the surface of the Teflon sheet 47. The Teflon sheet 47 acts as a permeable barrier which resists the flow of secondary air, thereby inducing a pressure differential across the Teflon sheet 47. The Teflon sheet 47 also has the characteristic of enabling a predictable and repeatable gas flux in response to pressure differential. The Teflon sheet 47 thereby distributes air evenly across the entire extent of the catalyst-containing labyrinthine channel 42. Because secondary air is distributed over the entire surface of the Teflon sheet 47, there is no need for a large number of secondary air inlet ports; one or two will suffice.

The fin block 35 and the air distribution plate 37 are assembled within the containment shell 36, as shown in FIG. 10. The reactor assembly 33 is completed by the attachment of the second end plate 38. The second end plate contains a centrally located reactant gas inlet port 43 through which the reactant gas mixture is introduced.

The entire reactor assembly is contained within the containment shell 36, as shown in FIG. 10. The shell 36 preferably is made of stainless steel. In final assembled form, the reactor assembly 33 is held together with stainless steel flanges, tie rods (not shown in FIG. 10) and nuts 49. The interior assembly, including the fin block 35, fins 41, air distribution plate 37 preferably is made of aluminum. As assembled within the containment shell, the aluminum components are provided with clearance to expand both radially and axially within the stainless steel containment vessel. This allows the individual components to accommodate the differences in thermal expansion between the dissimilar metals of construction.

As in previously described reactor 10, the reactants pass through the labyrinthine channel 42 of reactor 33, and travel radially outwardly from the center of the reactor 33. The reactants eventually reach the outermost arcuate section of the labyrinthine channel 42 which has a single opening 50 through which the product molecules pass out of the reactor 33 through the product gas outlet port 44.

The efficacy of the present invention in removing carbon monoxide through selective oxidation to carbon dioxide is demonstrated by the following example.

EXAMPLE

Experiments were performed to determine the carbon monoxide content of the reactant gases as they flowed through the labyrinthine channel of the selective oxidizing reactor 10 or 33. The measurements were made by sampling the gas flow at various points along the reaction pathway within the reactor by means of both infrared spectrophotometric and gas chromatographic methods of analysis.

For each experimental run, a coolant temperature was established and thermal fluid was circulated in the reactor until the reactor achieved a steady state temperature condition. For any one run, a reactant flow rate was selected, an inlet air stoichiometric ratio was selected, and the appropriate amount of air was proportioned into the stream of gas taken from the reformer.

Measurements of the carbon monoxide concentration by the above mentioned methods were made at the feed stock inlet port, the product outlet port, and at various points along the catalyst bed. The measurements were first performed without the addition of any secondary air. The results are displayed in FIG. 14, the solid line plot indicating the carbon monoxide concentration within the reactor as a function of the distance along the interior catalyst-packed channel that the reactants had travelled from the point of injection to the point of measurement. As FIG. 14 indicates, at some point along the passage through the reactor, the carbon monoxide content begins to increase by a significant amount. It is believed that this increase in carbon monoxide concentration is due to the effect of a reverse water gas shift reaction. In the reverse water gas shift reaction, carbon dioxide reacts with hydrogen to produce additional carbon monoxide and water. Although the eventual carbon monoxide level measured at the outlet was not as high as the original carbon monoxide concentration at the inlet, the data indicates that the carbon monoxide content of the product gas mixture may be too high for some applications, particularly electrochemical fuel cell applications employing platinum catalysts, under the process conditions of the experiment.

Figure 14:
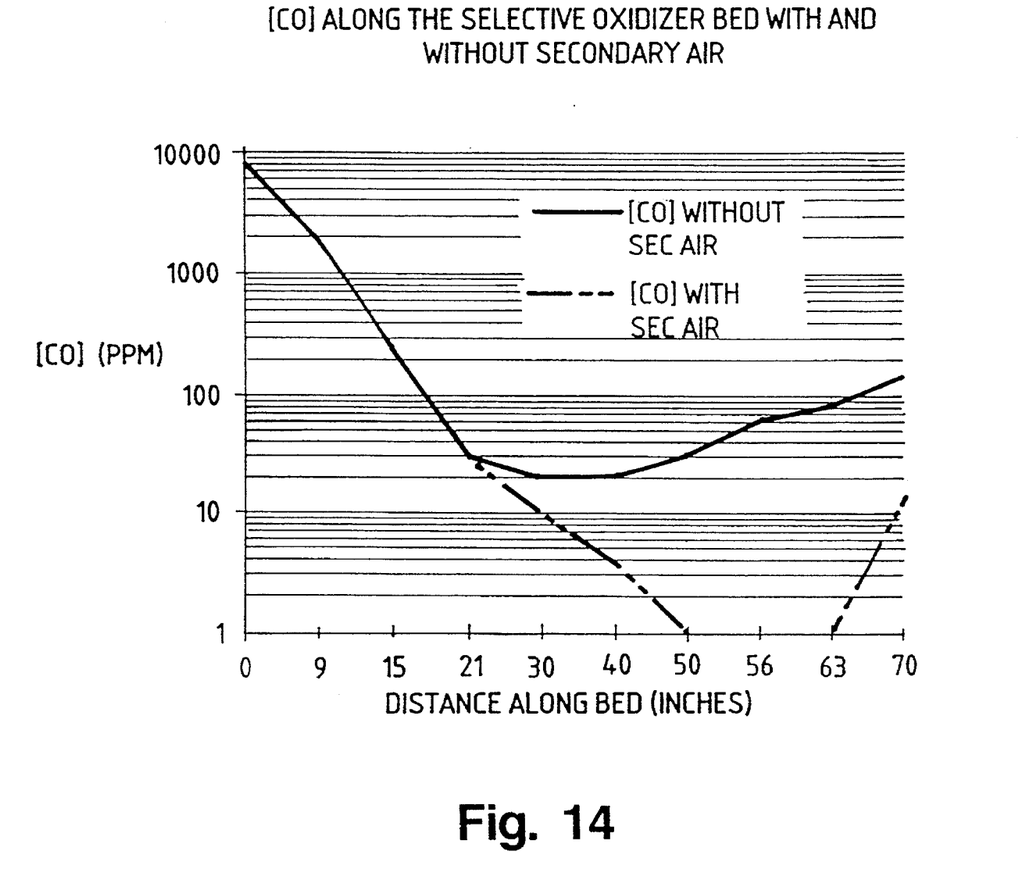
FIG. 14 is a plot of the carbon monoxide concentration in a gaseous mixture produced by a steam reformer as a function of distance the gaseous mixture has travelled along the selective oxidizer catalyst bed from the feed stock inlet port.

The experiment was repeated but with the additional step of introducing secondary air at various points along the catalyst bed. As in the previous experiment, the reactant gases were sampled at various distances from the feed stock inlet port, and the carbon monoxide concentration at each point was measured. The experimental results are shown in FIG. 14 as the dotted line plot. FIG. 14 shows that the addition of secondary air along the reaction pathway significantly reduces the resulting carbon monoxide level, and produces a significantly lower carbon monoxide concentration at the outlet.

The experimental results plotted in FIG. 14 should be interpreted in view of the process conditions under which the experiments were conducted. The overall phenomenon displayed in FIG. 14, when no secondary air was introduced, is a function of both the temperature at which the reaction is run and the volume flow rate, or space velocity, of the inlet gases. In general, the reverse water-shift reaction rate increases at higher temperatures, thereby resulting in higher levels of carbon monoxide (CO) at reduced reactant flow rates. It is theoretically possible to virtually eliminate the-water-shift phenomenon at temperatures of about 70° C. However, the carbon monoxide (CO) conversion rate also decreases dramatically at lower temperatures, thus requiring more catalyst, and a larger reactor to process the same amount of fuel. As the use of methanol is frequently advanced for portable and motive fuel cell applications, there is a penalty for size, weight and cost required for the larger reactor.

With respect to FIG. 14, it should also be noted that for the reactant flow rate (throughput) for which the illustrated data was gathered, a reactor length of 30–40 inches would provide sufficiently low levels of carbon monoxide (CO) without the injection of secondary air. However, if the throughput is decreased from that illustrated in FIG. 14, all of the primary air would once again be consumed before the 30 inch reactor length was traversed, and for the remaining length of reactor, the reverse water-shift reaction would proceed unopposed to re-form carbon monoxide (CO) from the carbon dioxide ($CO_2$) and hydrogen in the reaction product. At such lower flow rates, the concentration of carbon monoxide (CO) exiting the reactor would again be unacceptably high.

The present method and apparatus is suited for use in conjunction with electrochemical fuel cells, particularly those employing solid polymer electrolytes that consume hydrogen and oxygen as the reactants and produce electrical power and water as the reaction product (see, for example, U.S. Pat. No. 5,108,849). While the present selective oxidizing method and apparatus is embodied as a separate complimentary unit, the hydrogen-containing product of which is then fed to the fuel cell, the present method and apparatus could be embodied in the fuel cell itself by incorporating a suitable reaction chamber for containing catalyst within the fuel cell and providing suitable oxygen inlets to support the selective oxidation process within the fuel cell.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An isothermal reactor comprising:
   (a) a fin block comprising:
      (1) an inner surface and an outer surface;
      (2) a plurality of heat transfer surfaces extending substantially perpendicularly from said inner surface;
      (3) at least one internal passageway for circulating a thermal fluid therethrough for supplying heat to or removing heat from said reactor;
   (b) a gas distribution plate comprising an inside surface and an outside surface, said inside surface of said gas distribution plate positioned substantially perpendicular to and in contact with said heat transfer surfaces thereby forming a labyrinthine channel between said inner surface and said inside surface, said labyrinthine channel having catalyst pellets disposed therein and further having an inlet and an outlet, said gas distribution plate further comprising a plurality of gas distribution ports for introducing an oxygen-containing gas into said labyrinthine channel and an inlet port in fluid communication with said inlet;
   (c) a first end plate adjacent to said outer surface;
   (d) a second end plate adjacent to said outside surface, said second end plate comprising a plurality of ports in fluid communication with said plurality of gas distribution ports and a reactant gas inlet in communication with said inlet port;
   (e) a containment shell interposed between said first end plate and said second end plate, said containment shell circumscribing said fin block and said gas distribution plate, said containment shell comprising a product gas outlet port, said product gas outlet port in fluid communication with said outlet; and
   (f) means for attaching said containment shell, said first end plate and said second end plate forming a pressure-tight assembly.

2. The isothermal reactor of claim 1 further comprising a plurality of porous metal tubes extending from said gas distribution ports of said gas distribution plate into said labyrinthine channel for introducing said oxygen-containing gas into said labyrinthine channel.

3. The isothermal reactor of claim 1 wherein said inlet port is located at or in proximity to a center of said gas distribution plate.

4. The isothermal reactor of claim 1, wherein said at least one internal passageway comprises a coiled tube having a coil inlet and a coil outlet and wherein said containment shell comprises a coil inlet port to accommodate said coil inlet and a coil outlet port to accommodate said coil outlet.

5. The isothermal reactor of claim 4 wherein said fin block is formed of aluminum and wherein said coiled tube is formed of stainless steel.

6. The isothermal reactor of claim 1 wherein said containment shell, said first end plate and said second end plate are formed of stainless steel.

7. The isothermal reactor of claim 1 wherein said inner surface has a plurality of substantially concentric circular grooves formed therein and said heat transfer surfaces comprise a plurality of substantially cylindrical fins, each of said fins having an axial slot formed therein, said fins mounted within said grooves so that said fins are in thermal contact with said inner surface, said fins joining with said inside surface to form said labyrinthine channel therebetween.

8. The isothermal reactor of claim 7 further comprising a plurality of porous metal tubes extending from said gas distribution ports of said gas distribution plate into said labyrinthine channel, at the location of said fin axial slots, for introducing said oxygen-containing gas into said labyrinthine channel.

9. The isothermal reactor of claim 7 wherein said substantially cylindrical fins are mounted into said grooves in said inner surface such that the axial slots in adjacent fins are disposed about 180 degrees apart such that said labyrinthine channel comprises a plurality of concentric arcuate segments.

10. The isothermal reactor of claim 7 wherein said substantially cylindrical fins are formed from aluminum or copper.

11. The isothermal reactor of claim 1 wherein said catalyst pellets comprise platinum supported on alumina.

12. The isothermal reactor of claim 1 wherein said catalyst pellets comprise a mixture of active catalyst pellets and inert pellets in at least a portion of said labyrinthine channel.

13. An isothermal reactor comprising:
   (a) a fin block comprising:
      (1) an inner surface and an outer surface;
      (2) a plurality of heat transfer surfaces extending substantially perpendicularly from said inner surface;
      (3) at least one internal passageway for circulating a thermal fluid therethrough for supplying heat to or removing heat from said reactor;
   (b) a gas distribution plate comprising an inside surface and an outside surface, said inside surface of said gas distribution plate having a recess formed therein, said gas distribution plate further comprising a sheet of porous, gas permeable material adapted to be received into said recess, said recess with said sheet of porous, gas permeable material positioned substantially perpendicular to and in contact with said heat transfer surfaces thereby forming a labyrinthine channel between said inner surface and said inside surface, said labyrinthine channel having catalyst pellets disposed therein and further having an inlet and an outlet, said gas distribution plate further comprising at least one gas distribution port, said at least one gas distribution port in fluid communication with said sheet of porous, gas permeable material for introducing an oxygen-containing gas into at least a portion of said labyrinthine channel through said sheet of porous, gas permeable material and an inlet port in fluid communication with said inlet;
   (c) a first end plate adjacent to said outer surface;
   (d) a second end plate adjacent to said outside surface, said second end plate comprising at least one end plate port in fluid communication with said at least one gas distribution port and a reactant gas inlet in communication with said inlet port;
   (e) a containment shell interposed between said first end plate and said second end plate, said containment shell circumscribing said fin block and said gas distribution plate, said containment shell comprising a product gas outlet port, said product gas outlet port in fluid communication with said outlet; and
   (f) means for attaching said containment shell, said first end plate and said second end plate forming a pressure-tight assembly.

14. The isothermal reactor of claim 13 wherein said recess and said sheet of porous, gas permeable material are annularly shaped.

15. The isothermal reactor of claim 13 wherein said porous, gas permeable material consists essentially of polytetrafluoroethylene.

16. The isothermal reactor of claim 13 wherein said inlet port is located at or in proximity to a center of said gas distribution plate.

17. The isothermal reactor of claim 13, wherein said at least one internal passageway comprises a coiled tube having a coil inlet and a coil outlet and wherein said containment shell comprises a coil inlet port to accommodate said coil inlet and a coil outlet port to accommodate said coil outlet.

18. The isothermal reactor of claim 17 wherein said fin block is formed of aluminum and wherein said coiled tube is formed of stainless steel.

19. The isothermal reactor of claim 13 wherein said containment shell, said first end plate and said second end plate are formed of stainless steel.

20. The isothermal reactor of claim 13 wherein said inner surface has a plurality of substantially concentric circular grooves formed therein and said heat transfer surfaces comprise a plurality of substantially cylindrical fins, each of said fins having an axial slot formed therein, said fins mounted within said grooves so that said fins are in thermal contact with said inner surface, said fins joining with said inside surface to form said labyrinthine channel therebetween.

21. The isothermal reactor of claim 20 wherein said substantially cylindrical fins are mounted into said grooves in said inner surface such that the axial slots in adjacent fins are disposed about 180 degrees apart such that said labyrinthine channel comprises a plurality of concentric arcuate segments.

22. The isothermal reactor of claim 20 wherein said substantially cylindrical fins are formed from aluminum or copper.

23. The isothermal reactor of claim 13 wherein said catalyst pellets comprise platinum supported on alumina.

24. The isothermal reactor of claim 13 wherein said catalyst pellets comprise a mixture of active catalyst pellets and inert pellets in at least a portion of said labyrinthine channel.

* * * * *